April 26, 1932.  A. K. SORENSEN  1,855,494
FLANGED RING JOINT
Filed Oct. 5, 1929
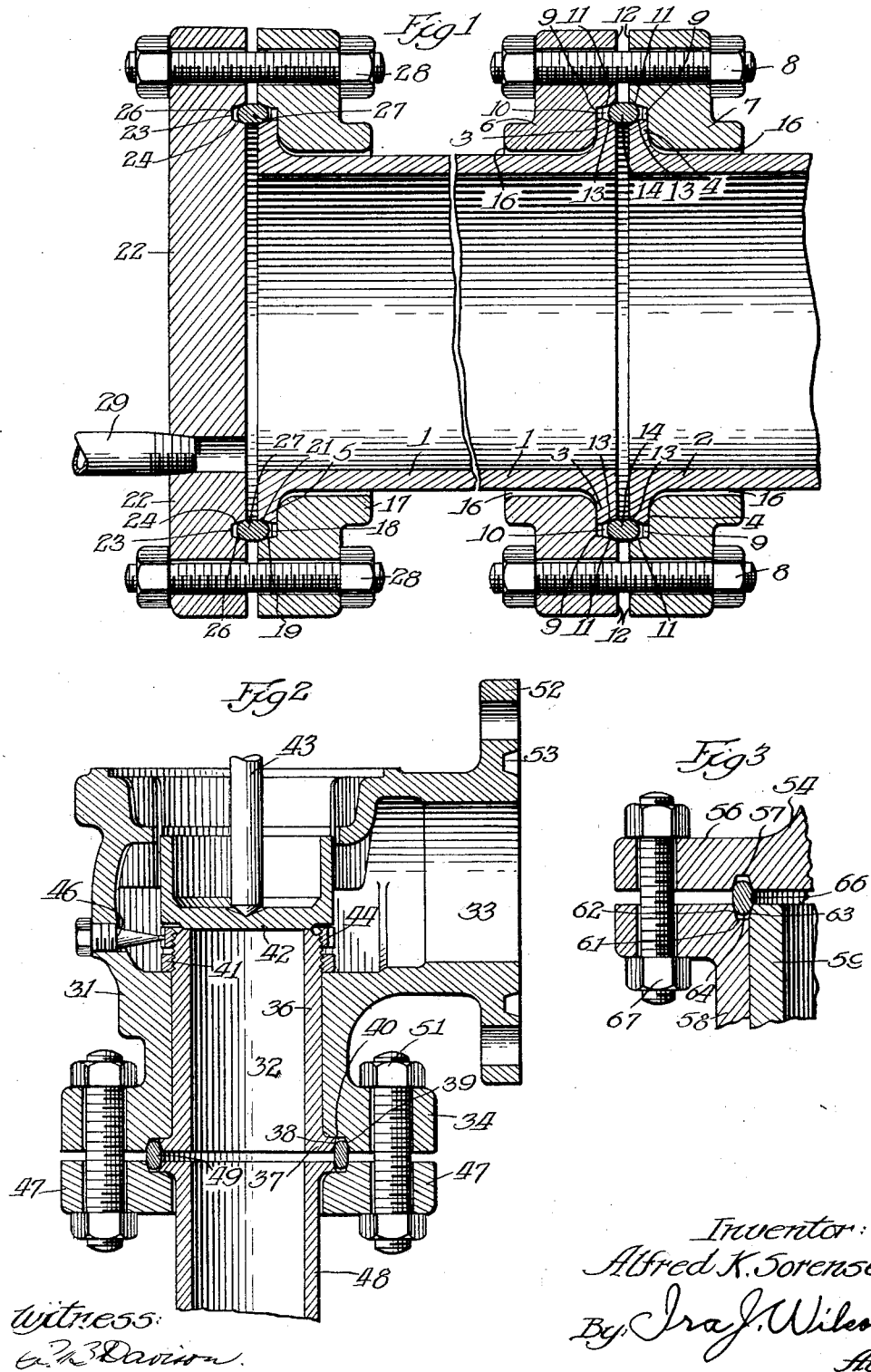

Patented Apr. 26, 1932

1,855,494

UNITED STATES PATENT OFFICE

ALFRED K. SORENSEN, OF CHICAGO, ILLINOIS, ASSIGNOR TO CRANE CO., OF CHICAGO, ILLINOIS, A CORPORATION OF ILLINOIS

FLANGED RING JOINT

Application filed October 5, 1929. Serial No. 397,462.

This invention relates to joints for pipes and pipe fittings and more particularly to a combination flange and ground joint. The features of this invention in addition to being suitable for joints between pipe sections are particularly well adapted to valve construction and may be incorporated into a valve structure to make a tight joint between the various component parts of a valve and also between the valve and the pipes leading thereto.

It has been customary heretofore to use both flange joints and ground joints and on the former to employ companion flanges in which the opposing faces of the adjoining flanges were either flat or stepped the two faces being bolted together with a flat gasket of some fibrous material or soft metal therebetween. Such a joint imparted great rigidity to the pipe and gave a fair degree of tightness up to and including moderately high pressures and temperatures. Such a joint was not as satisfactory upon high temperatures and pressures as a ground joint, the latter however, having structural limitations as to size.

It is the purpose of this present invention to provide a joint which incorporates the advantages of both the flange and the ground joints without the disadvantages of or weakening either and to thereby provide a joint which will withstand high temperature, high pressures and permit slight flexing of the members being secured. It is also an object of this invention to provide a ground joint which may be incorporated in a valve structure to very good advantage as a joining medium between the parts of the valve and also between the valve body and adjoining pipes.

In accordance with this invention the joint which is in the form of a flange joint, comprises a pair of companion flanges adapted to be drawn together by the usual bolts, the flanges being provided with a seating groove formed between an inner circumferential wall of the flange and the outer periphery of the pipe therein, to receive a seating ring. Preferably although not necessarily the flange joint employed is of the lap type such as is known in the trade as a Cranelap in which case at least one of the companion flanges is recessed to receive an out turned flange or rim of one of the connecting elements such as a pipe. In the present instance the inner circumferential wall of the recess and the outer peripheral edge of the out turned pipe flange are spaced to receive therebetween a ground seating ring. A complementary companion flange is either recessed in a similar manner or is grooved, if it be a blank flange, to receive the opposed surface of the seating ring, the two flanges being bolted together to grip the seating ring between the edges of the companion flanges and the edge of the pipe flange.

Other advantages and novel features of construction will be apparent from the following description of this invention given in connection with the drawings in which:

Fig. 1 is a section through the center of two lengths of pipe joined together by a flanged ring joint made in accordance with this invention, one end of one section also being terminated by a flanged ring joint in accordance with this invention.

Fig. 2 is a vertical section through the center of a valve showing the application of a flanged ring joint therein embodying the principles of this invention, and Fig. 3 is a section through a portion of a valve illustrating a bonnet construction showing an application of a flanged ring joint embodying the features of this invention.

Referring particularly to Fig. 1, there is shown two abutting ends of two pipe sections, 1 and 2 having out turned flanges 3 and 4 respectively. The out turned flanges 3 and 4 are adapted to be clamped together by a pair of companion flanges 6 and 7 bolted together by the usual bolts 8. Each companion flange is bored out slightly larger than the outer diameter of the pipe over which it fits and is formed upon its inner wall with a step-like recess 9 of a longitudinal depth equal to the thickness of the pipe flanges 3 and 4 and a radial depth in excess of the width of flanges 3 and 4 leaving a groove 10 between the outer peripheral edge of the pipe flange and the inner circumferential edge of recess 9, the peripheral edges being tapered away from each other as at 11 and 13 to receive a ground metal seating ring 14. Ring 14 is formed with its edges rounded to form a line contact against edges 11 and 13. The inner diameter of the body portion of flanges 6 and 7 being slightly greater than the outer diameter of pipes 1 and 2 thus leaving a space 16 between the hub of the companion flanges and the pipe permits of a slight misalignment of pipes 1 and 2 without affecting the tightness of the joint between the two pipes.

Fig. 1 also illustrates the manner in which the terminating end of a pipe may be closed off by a joint embodying this invention. For this purpose the terminating end of pipe 1 is flanged as at 5 in a manner similar to the flange 3 to cooperate with a companion flange 17 similar to flanges 12. Companion flange 17 and pipe flange 5 are constructed as heretofore described to provide a channel 18 between the companion flange and the pipe flange defined by tapered side walls 19 and 21. Instead of a companion flange like 17, however, a solid flange 22 is employed having an annular groove or channel 23, the side walls 24 and 26 of which are tapered, the channel 23 being opposed to channel 18 and arranged to receive a seating ring 27 therebetween. The two flanges 22 and 17 may be drawn together by means of bolts 28. If desired the flange 22 may be tapped to receive a bleed or drain pipe 29.

In Fig. 2 there is shown an application of a combination flange and ground joint to a valve structure. For purposes of illustration there is shown a portion of a safety or pop valve comprising a body portion 31 having an inlet 32 and outlet 33. The inlet is flanged as at 34 and bored to receive a sleeve 36 the lower end of which is provided with an out turned flange 37, the flange 34 being recessed to receive the same. The outer peripheral edge 38 of flange 37 and the inner circumferential edge or wall 39 of the recess formed in flange 34 are bevelled to provide a channel 40 similar to channels 10, 18 and 23 as heretofore described in connection with Fig. 1. The upper end of sleeve 36 is threaded to receive a locking nut 41 which engages the body and retains sleeve 36 therein. The upper terminating edge of sleeve 36 is faced to provide a seat for the valve disk 42 connected to a valve rod 43 actuated by any suitable means (not shown). A blow back ring 44 is also shown as adjustably engaging the threaded end of sleeve 36, ring 44 being locked in selected position by means of set screw 46 in the usual manner. Connection to the inlet of the valve may be made by means of a companon flange 47 surrounding a flanged inlet pipe 48 and a seating ring 49, flange 34 and 47 being drawn together by means of bolts 51. The outlet end of the valve may also be flanged as at 52 and grooved as at 53 for connection to a discharge pipe (not shown).

In Fig. 3 there is shown a portion of a valve illustrating the application of a joint, constructed in accordance with this invention, to the bonnet connection of a valve. A portion of the bonnet member 54 is shown as being formed with a flange 56 the flange having a tapered channel 57. The body member 58 of the valve is bored to received a sleeve 59 which in this instance extends upwardly to the bonnet member 54. The body member 58 is recessed as at 61 and the inner circumferential edge 62 of the recess is tapered. The outer wall of the terminating end of sleeve 59 is also tapered as at 63 to provide a tapered channel 64 between walls 62 and 63. Channels 57 and 64 are opposed to each other and are adapted to receive a ground metallic seating ring 66 therebetween when clamped together by the usual bolts 67. The lower end of the body 58 and sleeve 59 may be constructed as shown in Fig. 2, or in any other desired manner. It is to be understood also that the sleeve 59 of Fig. 3 may be of the form shown in Fig. 2 if so desired.

From the above description it is apparent that there is provided a combination flange and ring joint which will withstand high pressures and temperatures and which will permit slight variations in alignment of the parts being connected without affecting the effectiveness of the joint. It is further pointed out that by drawing the flanges together and compressing the sealing ring between an outer peripheral edge and an inner circumferential edge or wall as shown the flanges and consequently the joint is not weakened as would be the case were the opposed or facing surfaces of the flanges grooved to receive a seating ring. In the latter case the grooves would weaken the flanges and the drawing of the flanges together would tend to disrupt the flanges by stretching the flanges in the direction of their least strength whereas in the present invention the thickness of the flange is not reduced and the drawing action of the bolt compresses the ring inwardly against the edges of the opposed flanges rather than against the faces of the opposed flanges. As shown in Figs. 2 and 3 the joint constructed in accordance with this invention is well adapted to valve structures and particularly well adapted to a valve structure embodying a seating sleeve as in this case the sleeve itself can be flanged to cooperate with the flange upon the body member to seal both the flange and the body member to the adjoining connection.

It is obvious that minor changes may be made in the details of construction without departing from the spirit and scope of this invention as defined in the appended claims in which the term pipe is used in its broadest aspect to include any form of tubular conductor be it a part of a fitting or a section of a pipe as it is commonly known to the trade.

I claim:

1. A ground joint pipe connection joining a pair of abutting pipe ends comprising a pair of substantially rigid flanges formed integrally and substantially perpendicular to the axis of the pipe on the abutting ends of the pipes to be joined, the outer peripheral edges of said flanges being inclined, a pair of companion flanges adapted to engage said pipe flanges to draw said pipe flanges together, said companion flanges having annular recesses formed therein defined by inclined side walls arranged in opposed relation to the inclined peripheral edges of said pipe flanges to provide a chamber between said pipe flanges and companion flanges, the sides of which are inclined, a substantially rigid seating ring of greater thickness than said chamber and having curved surfaces engaging the opposed inclined flange walls and flange edges along four opposed annular lines, and means for drawing said companion flanges together to grip said ring between said pipe and companion flanges.

2. A ground joint pipe connection comprising a pair of abutting pipe ends having a pair of inclined surfaces formed upon the exterior surface of said pipes to be joined adjacent the abutting ends thereof, a pair of companion flanges adapted to engage the abutting ends of said pipes to draw said pipes together, said companion flanges having annular recesses formed therein defined by inclined side walls arranged in opposed relation to said inclined pipe surfaces to provide a chamber between said surfaces and said inclined walls, a substantially rigid seating ring having opposed curved walls and being of greater thickness than said chamber, said ring being disposed between said inclined surfaces and walls with its opposed curved surfaces and in contact therewith along four opposed annular lines, and means for drawing said companion flanges together to grip said ring in said chamber and between the inclined walls thereof.

3. A ground joint pipe connection comprising a pair of companion flanges bored to receive the ends of the pipes being connected, a substantially rigid seating ring, the ends of said pipes being formed with integral outwardly extending substantially rigid flanges, said companion flanges being recessed to receive said pipe flanges, and the inner circumferential walls of said recesses and the outer peripheral edges of said pipes being inclined and spaced from each other to provide a chamber therebetween, a substantially rigid seating ring of greater thickness than said chamber and having a curved outer surface disposed within said chamber and in direct contact with said flange edges and said inclined walls along four opposed annular lines of contact, and means for drawing said companion flanges together to grip said ring within said chamber.

4. In a valve, a body member terminating in a substantially rigid flange extending perpendicular to the axis of the body, a sleeve disposed in said body and extending to said flange, said flange being recessed adjacent said sleeve to provide an annular groove between said flange and the external wall of said sleeve, the exterior end marginal wall of said sleeve being inclined away from said flange and a substantially rigid seating ring having a curved outer surface within said groove adapted to be secured therein by an adjoining member to form a tight seal between said members said ring engaging said groove along four annular lines of contact.

In witness of the foregoing I affix my signature.

ALFRED K. SORENSEN.